(12) United States Patent
Jenkins

(10) Patent No.: US 10,015,276 B2
(45) Date of Patent: Jul. 3, 2018

(54) DISCOVERING DATA NETWORK INFRASTRUCTURE SERVICES

(71) Applicant: BRITISH TELECOMMUNICATIONS PUBLIC LIMITED COMPANY, London (GB)

(72) Inventor: Ian William George Jenkins, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 836 days.

(21) Appl. No.: 14/360,057

(22) PCT Filed: Nov. 23, 2012

(86) PCT No.: PCT/GB2012/000860
§ 371 (c)(1),
(2) Date: May 22, 2014

(87) PCT Pub. No.: WO2013/079897
PCT Pub. Date: Jun. 6, 2013

(65) Prior Publication Data
US 2014/0325021 A1    Oct. 30, 2014

(30) Foreign Application Priority Data

Nov. 30, 2011    (EP) .................................... 11250917

(51) Int. Cl.
*G06F 15/16* (2006.01)
*H04L 29/08* (2006.01)
*H04L 29/12* (2006.01)

(52) U.S. Cl.
CPC .............. *H04L 67/32* (2013.01); *H04L 67/14* (2013.01); *H04L 61/1511* (2013.01); *H04L 61/2514* (2013.01)

(58) Field of Classification Search
CPC ..... H04L 67/14; H04L 67/32; H04L 61/1511; H04L 61/2514
See application file for complete search history.

(56) References Cited

U.S. PATENT DOCUMENTS

2002/0093956 A1 * 7/2002 Gurin .................. H04L 12/5692
370/389
2003/0187979 A1 * 10/2003 Hekstra ............... H04L 12/5692
709/224

(Continued)

FOREIGN PATENT DOCUMENTS

WO    WO 02/37869        5/2002
WO    WO 0237869 A2 *    5/2002    ............. H04L 29/06

OTHER PUBLICATIONS

International Search Report for PCT/GB2012/000860 dated Aug. 1, 2013.

(Continued)

*Primary Examiner* — Douglas Blair
*Assistant Examiner* — Ishrat Rashid
(74) *Attorney, Agent, or Firm* — Nixon & Vanderhye P.C.

(57) ABSTRACT

A method and apparatus for providing services that are adapted to the access networks of end users (10). By providing defined information to a residential gateway (110) and/or an access network provider (12) a service provider (18) enables the access network provider (12) to open a dedicated communications channel (20) between itself and the service provider. The service provider can use this channel to request information about the capabilities of the end user's access network as well as for requesting conditioning of data streams sent to said end user.

15 Claims, 5 Drawing Sheets

(56) References Cited

U.S. PATENT DOCUMENTS

| | | | |
|---|---|---|---|
| 2004/0039820 A1 | 2/2004 | Colby et al. | |
| 2005/0141541 A1* | 6/2005 | Cuny | H04W 76/02 |
| | | | 370/437 |
| 2006/0288071 A1* | 12/2006 | Bigioi | H04L 12/2803 |
| | | | 709/203 |
| 2009/0135839 A1* | 5/2009 | Khasnabish | H04L 63/164 |
| | | | 370/401 |
| 2010/0077099 A1* | 3/2010 | Gordon | H04L 67/322 |
| | | | 709/233 |
| 2012/0054348 A1* | 3/2012 | Rollgen | H04L 65/1069 |
| | | | 709/227 |
| 2012/0290686 A1* | 11/2012 | Anchan | H04L 61/2514 |
| | | | 709/218 |

OTHER PUBLICATIONS

English translation of Chinese Office Action dated Jul. 5, 2016 issued in corresponding Chinese Application No. 201280059158.5 (10 pages).

English translation of Chinese Office Action dated Mar. 16, 2017 issued in corresponding Chinese Application No. 201280059158.5 (7 pages).

English translation of Chinese Office Action dated Sep. 18, 2017 issued in corresponding Chinese Application No. 201280059158.5 (5 pages).

\* cited by examiner

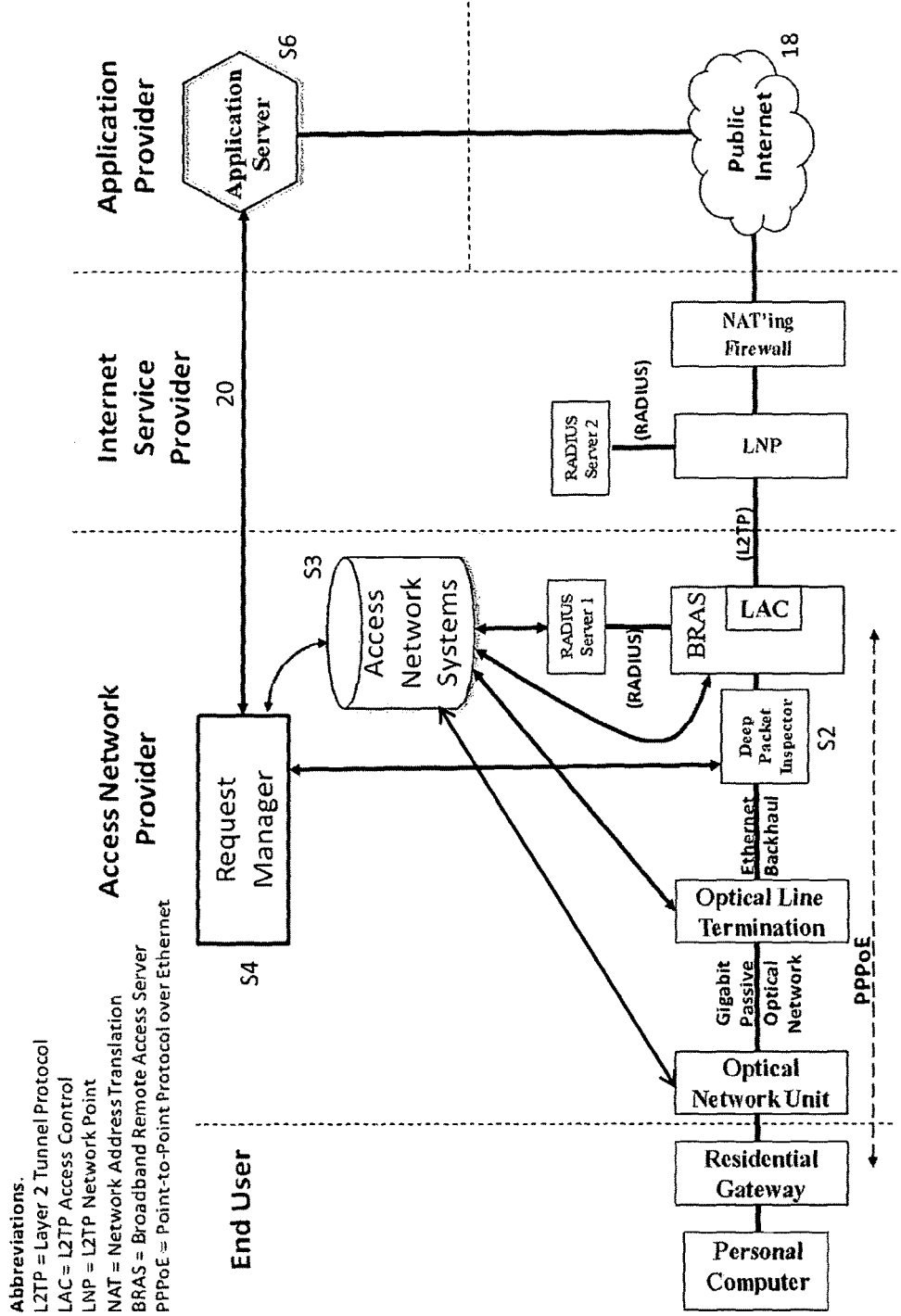

DISCOVERING DATA NETWORK INFRASTRUCTURE SERVICES

This application is the U.S. national phase of International Application No. PCT/GB2012/000860 filed 23 Nov. 2012 which designated the U.S. and claims priority to EP 11250917.9 filed 30 Nov. 2011, the entire contents of each of which are hereby incorporated by reference.

FIELD OF THE INVENTION

The present invention relates to delivery of services, such as application and content services, to end users and particularly but not exclusively to a method and system that improves the end user's experience of the delivered service by establishing a direct communications channel between a service provider and an end user's access network provider over which channel the capabilities of the end user's access network as well as packet prioritisation requests can be exchanged.

BACKGROUND OF INVENTION

There is an increasing user demand for content provided from content providers over the Internet. Such content comprises among other things films, games, music, video telephony etc. Most customers enjoy these services via a broadband access from an Internet Service Provider (ISP) but in many cases the ISP buys the access and backhaul aggregation from an Access Network Provider (ANP). In most cases the ISP provides the login service and the subsequent allocation of the Internet address to the end user's equipment. However the ISP does not know the individual speed of each customer's connection, its technology type or the location of that connection.

Application Providers (AP) usually have a direct relationship with the end user, independent of the ISP or ANP and they have limited or no knowledge of which ISP an end user might be using, yet alone the ANP. The IP address used by the end user may have been network address/port address translated (NAT) by the ISP and in some cases subsequent address/port translation can take place. In addition, the IP address allocated by the ISP may be to a residential gateway that performs network address translation of local terminal IP addresses, and the terminal requesting the service may be one of a number, each with a private IP address allocated by that gateway or other means.

Due to this lack of knowledge of which ISP or ANP the end user is using the content provider cannot directly establish any properties of the end user's access connection.

EP2169 914 describes a method and system for content delivery in which a plug-in at the end user system gathers information about the end user system such as IP address and characteristics of the end user system via a run-time application environment hosted in the end user system. These characteristics are thereafter used by an algorithm to determine the suitable content delivery bit-rate. However, this relies on deploying and maintaining software to the end user's device, which becomes more problematic with the increase of various smart devices. Also, this technique cannot determine the geography of the user to facilitate the closest content cache or provide any control path to the access network to prioritise content delivery.

Hence, there is a need to provide a method and system for providing information to an application or service provider regarding the properties or characteristics of access networks used by end users, in order to optimize the delivery of applications or services, which is independent of the type of end device and where it is located.

SUMMARY OF INVENTION

According to a first aspect of the invention there is provided method of providing a data stream to an end user from a service provider, comprising said service provider:

receiving at a server a request for a data stream from the end user;

in response to receiving said request constructing a discovery message in order to discover an access network provider for said end user, said discovery message comprising defined information that will enable said access network provider to create an independent dedicated communications channel between a server of the access network provider and the server of the service provider; and transmitting the data stream and said discovery message to said end user.

According to a second aspect of the invention there is provided a method of providing a data stream to an end user from a service provider comprising at an intermediate access network provider system:

receiving the data stream addressed to an end user from a service provider server;

detecting a discovery message in said stream;

retrieving defined information from said discovery message; and using said information to open an independent dedicated communications channel to the service provider server.

By configuring the service provider server and the access network provider system to perform according to these methods a direct communications dialogue can be established between the service provider and an access network provider without reference to any intervening networks and regardless of any network translation that might have been applied to the request for a service.

Preferably, the discovery message is multiplexed onto the data stream by utilising an enhancement to the STUN (Session Traversal Utilities for NAT) protocol as defined by the IETF standard RFC 5389, wherein the enhancement is by addition of new fields for the discovery message.

Preferably, the service provider server uses said created dedicated communications channel for requesting and receiving characteristics of the end user's access network from the access network provider system and selecting and/or adapting how and from where the service be delivered to the end user based on said received characteristics.

By enabling the service provider to discover the access network provider and obtain information regarding characteristics and geographic location of the end user's access network the provisioning of services to the end user can be optimised by adapting or selecting services in accordance with the characteristics of the network as well as and providing the service from a location closer to the end user.

Preferably, said service provider server uses said created independent dedicated communications channel to request the user's access network for conditioning of the data stream by controlling the prioritisation of packets in the data stream in relation to packets in other streams at the access network.

By enabling the service provider to request conditioning of the data stream over the dedicated communications channel any delay sensitive content requested by the end user can be prioritised in the access network to provide a consistent quality of the service.

In a third aspect of the invention there is provided service providing server for providing a data stream to an end user, said server comprising an interface arranged to receive and transmit data streams from/to end users;

a service logic arranged to construct a discovery message in response to receiving a request for a data stream from the end user, wherein said discovery message comprises defined information that will enable an access network provider to create an independent dedicated communications channel between a server of the access network provider and the server of the service provider;

wherein said interface is further arranged to transmit the data stream and said discovery message to said end user.

In a fourth aspect of the invention there is provided access network provider system managing an access network through which a data stream sent from a service provider to an end user flows; said access network provider system comprising a data probe arranged to monitor data streams flowing through the access network in order to detect and copy a discovery message packet in a stream;

a request manager server arranged to receive a copy of said discovery message packet from the data probe and to retrieve defined information from said discovery message, said request manager server further being arranged in operation to create a dedicated communications channel to a server of the service provider based on the retrieved information.

In a fifth aspect of the invention there is provided a system for providing a data stream to an end user from a service provider said system comprising a service providing server and an access network provider system as described above.

In a sixth aspect of the invention there is provided a computer program or suite of computer programs for use with one or more computers to perform the described methods.

In a seventh aspect of the invention there is provided a computer program product comprising an electronically readable data carrier containing instructions, which when executed by a programmable processor, operate according to the described methods.

BRIEF DESCRIPTION OF THE DRAWINGS

Embodiments of the invention will now be described, by way of example, with reference to the accompanying drawings in which:

FIG. 5 shows a typical implementation for a wholesale Fibre-to-the premise network operator.

DESCRIPTION OF PREFERRED EMBODIMENTS

Figure 1:
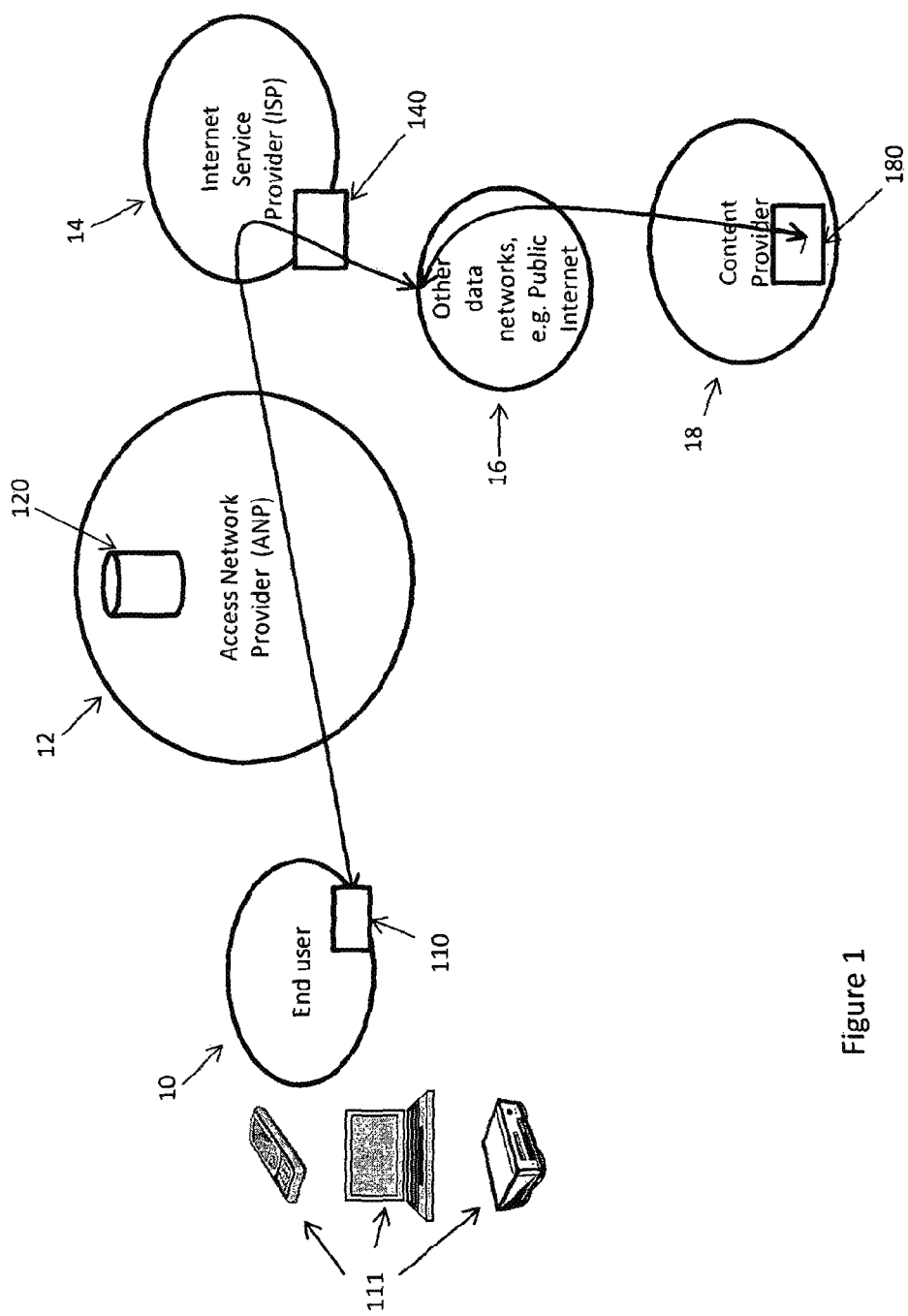
FIG. 1 shows a schematic view of a prior art system for content delivery over the Internet.

FIG. 1 shows a schematic view of a prior art system for content delivery over the Internet. An end user wishes to obtain content from a content service provider 18. The data connection from the end user to the content service provider 18 and back goes through different network domains. A user terminal 111 may be connected directly to an access network provided by an access network provider 12 or the user terminal may be part of a local network 10, which can be a wireless local area network WLAN or a wired local area network which provides network connection to a number of different end user terminals 111 such as computers, smart phones, set-top boxes or audio players. The local network 10 comprises a residential gateway 110, which may perform network address translation of local terminal IP addresses. The end user gains any services via the Access Network Provider (ANP) 12.

The ANP 12 comprises systems, servers, and various databases, memories and processors (not shown) which are configured to forward network attachment requests to the end user's Internet Service Provider (ISP) 14. The ANP 12 further comprises a database 120 where data about the access network technology, topology, user connections and connection status is stored.

The ISP 14 has systems which comprise various databases, memories and processors (not shown) that are configured to validate the attachment request (log in) and allocate an IP address if required. The ISP 14 may further comprise a firewall 140. After a successful attachment the end user has access to other networks, such as the public Internet 16 but may be subject to network address translation NAT and/or port address translation PAT when traversing the firewall 140. Other firewalls may also exist within the end user's data connection. The public internet 16 is configured to forward the service or content request to a content server 180 belonging to the content service provider 18.

The content server 180 may comprise one or more interfaces for receiving and sending data streams from/to end users and databases and processors (not shown here) configured by service logic (software modules) to determine if the end user is entitled to receive the requested service or content or configured to perform other tasks. If the request for service is granted the content server 180 sends the requested service or content to the end user using the IP address allocated to the end user by the NAT function within the firewall 140, where the IP address is translated back to the IP address of the residential gateway 110, or if there is no such gateway, to the IP address allocated to the end user terminal 111.

Figure 2:
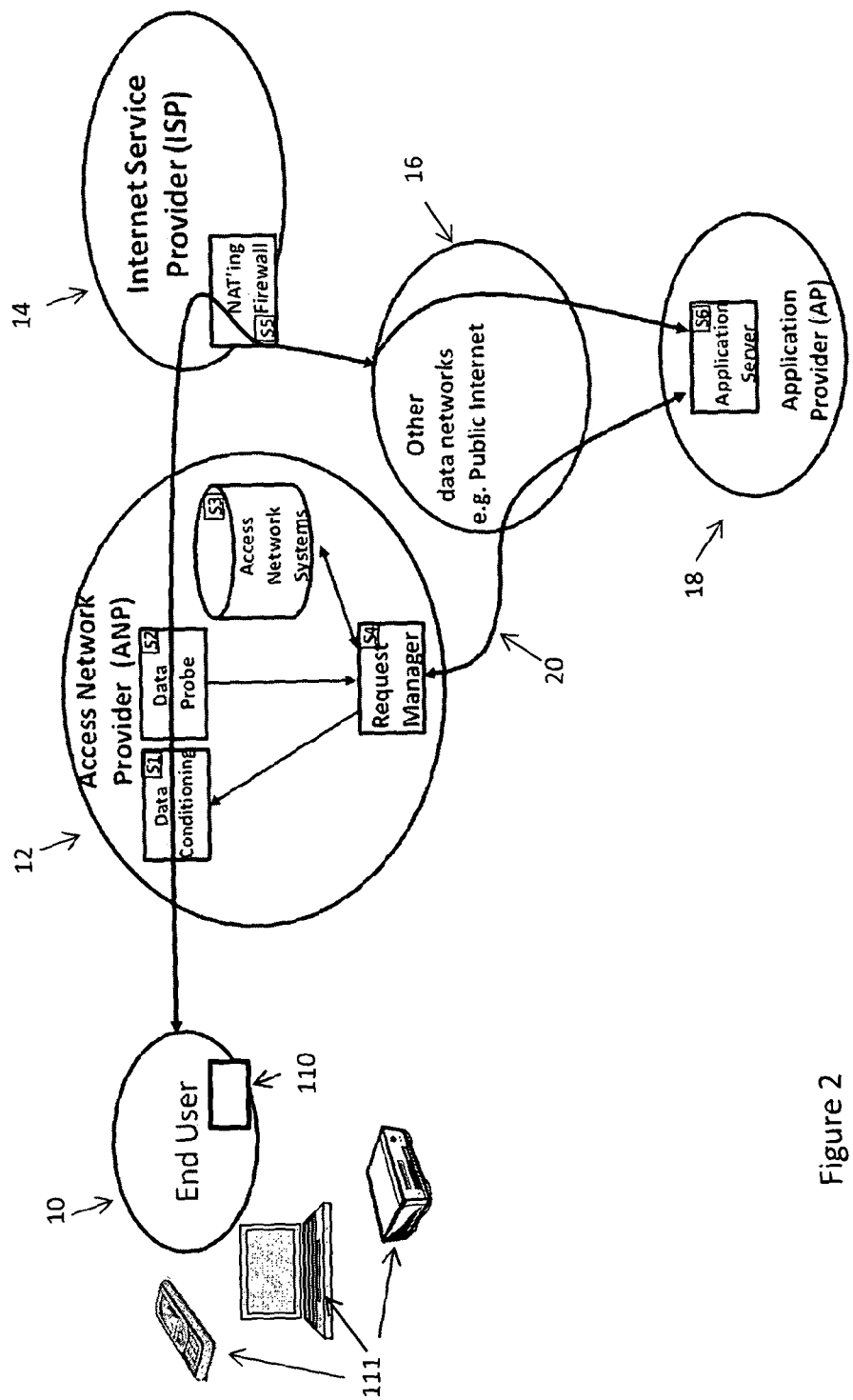
FIG. 2 shows a generic implementation of a system according to an example of the present invention.

With reference to FIG. 2 a first embodiment of a system according to the present invention will now be described. In this embodiment the service provider is an application provider where the applications can be content such as films, music, video telephony etc streamed over the Internet to the end user network 10.

This system differs from the state of the art system shown in FIG. 1 in that both the access network provider system 12 as well as the application provider server 18 comprises novel features for enabling the two to open a dedicated communications channel between them.

As in the prior art system the application provider server [S6] (corresponding to content server 180 in FIG. 1) comprises an interface arranged to receive and send data from/to an end user; processors; databases and service logic arranged to provide the services to the end users. In addition, the service logic is configured by a software module to multiplex a discovery message comprising defined information onto a data stream sent to the end user in response to receiving a request for a service (data stream) from the end user. The application provider server further comprises a service selection module arranged to select and/or adapt a service or content to the capabilities of the end user's access network in response to receiving access network capabilities from the access network provider system; and a conditioning module arranged to control the prioritisation of packets in the data stream in relation to other streams passing through the access network or to control the allocation of bandwidth in response to receiving access network capabilities from the access network provider system.

The access network provider system 12 additionally comprises a data flow control system [S1], a data probe [S2] and a request manager server [S4]. The data flow control system [S1] is configured to priority mark and queue data packets associated with a particular data flow. The data probe [S2] is configured to examine data packets in passing flows and copy specifically identified data packets, i.e. the discovery message, to the request manager server [S4]. The request manager server is configured to receive the packet, extract the defined information in the packet and open a dedicated communications channel 20 between the ANP 12 and the AP 18 based on the defined information. The request manager server [S4] comprises one or more processors; one or more memories; and software modules which when loaded in the memory and run by the processor(s) perform parts of the method to be described.

As in the state of the art system the end user gains service via the ANP 12 which forwards a network attachment request to the ISP 14. ISP 14 validates the attachment request (log in), and it is allocated an IP address if required. The end user then accesses the service or content from the AP 18 via the ANP 12 and the ISP 14 with the request passing through a firewall [S5] over the public Internet 16 to the AP server [S6].

As described earlier it would be useful for the AP server [S6] to know the characteristics of the end user's access network and to have the option to control those characteristics provided by the ANP 12. Should the Application Server [S6] require this service from the ANP 12 it will multiplex a message with a special signature onto the data stream sent to the end user. The content of the multiplexed message identifies the AP's Application Server [S6] e.g. a Fully Qualified Domain Name (FQDN) registered in the Public Domain Name Service (DNS) and the individual end user's session via a transaction identifier which is unique to the AP' application server [S6] for the duration of the end user interaction. This message will be detected at the data probe [S2] incorporated in the ANP system 12. When detected the message packet is copied by the data probe [S2] to the ANP's request manager server [S4]. The request manager server [S4] is configured to store the message information along with the destination IP address and port number of the received multiplexed packet i.e. that of the end user as seen in the access network and any other local network information related to where in the topology of the access network this message was detected e.g. data backhaul circuits and aggregation points. The request manger [S4] is further configured to open a direct and independent data connection with the application server [6], citing the transaction identifier and the ANP's 12 identity e.g. its own FQDN. Once this connection is established, the application server [S6] can request the ANP 12 for information about the properties of the end user's access network, referencing the particular data flow using the transaction identifier. Using FQDNs for the AP's 18 identity and the ANP's 12 identity, these in combination with the transaction identity form a globally unique dialogue reference for the duration of the end user's session. When the request manager server [S4] receives such a request for network properties from the AP 18, the request manager server [S4] is configured to retrieve the IP address and any network topology information stored against this dialogue and uses this data to index into information stored within the access network management database [S3]. Having retrieved the requested information, the request manger [S4] passes it back to the application server [S6]. If the application server [S6] requests that the data session delivered to the end user should be conditioned within the access network e.g. prioritise packets, allocated un-contended bandwidth, restrict bandwidth etc, the request manager server [S4] is configured to interact with the data network component(s) that controls the data flow control system [S1] to achieve this.

Figure 3:
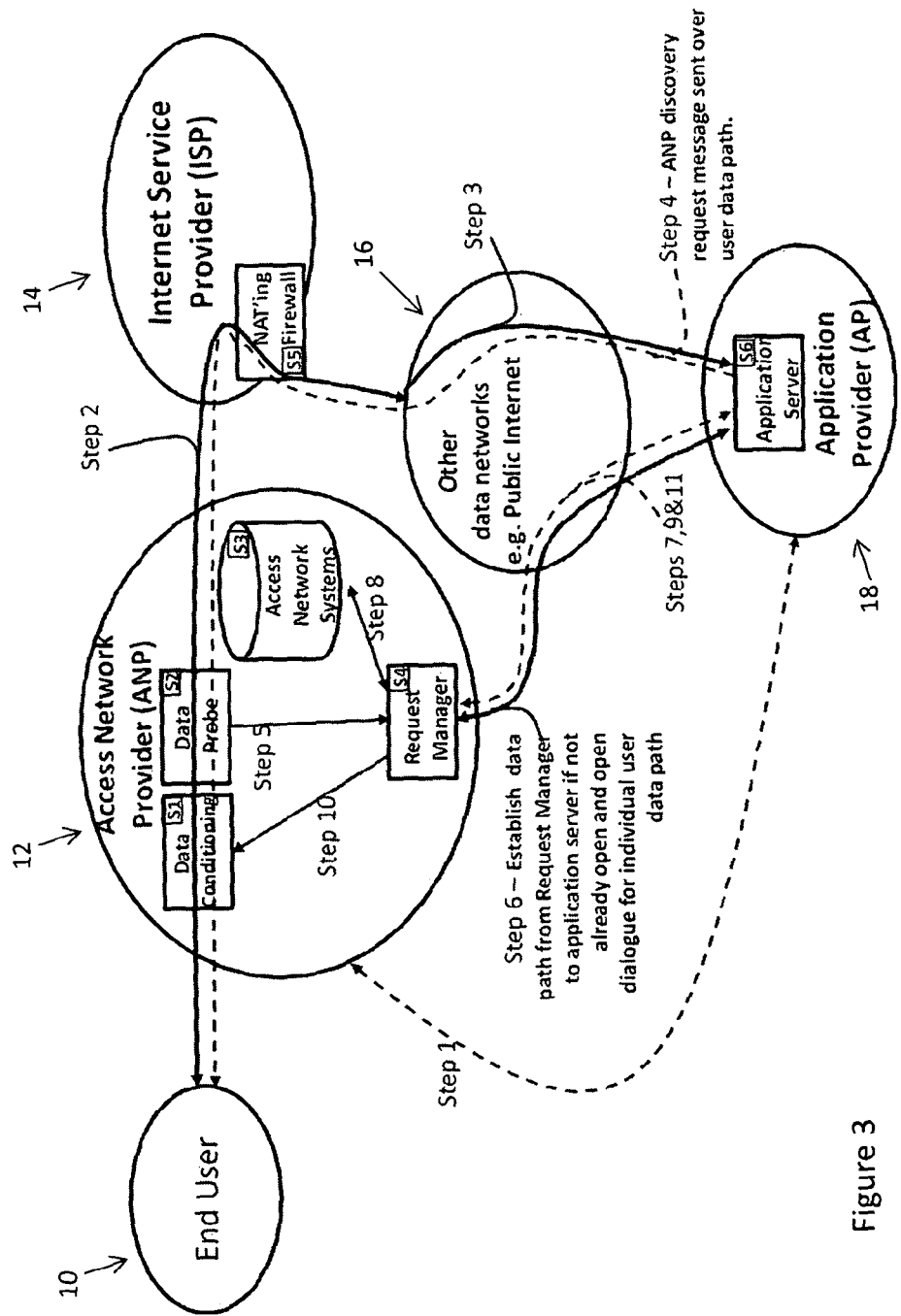
FIG. 3 shows the process and information flows in the system of FIG. 2.

Hence, with reference to FIG. 3, the following steps are followed in order for an Application Provider (AP) 18 to discover the Access Network Provider (ANP) 12.

Step 1—(Optional)

The AP 18 and ANP 12 exchange security credentials if an authenticated or privacy assured data connection between them over which they communicate, directly is required. They would also exchange identity information that would be put into any message exchange between them over the data connection, so that each party can simultaneously serve multiple entities. These identities should be in a globally unique naming space to avoid conflicts when APs and ANPs have multiple relationships. An example of a unique identity is one built around a registered Fully Qualified Domain Name FQDN e.g. AnyAP.com or AnyANP.com. This identity may be synonymous with, or a part of, a public DNS entry that resolves to the IP address required to establish the data connection with the AP server [S6].

Step 2

The end user logs into their ISP account and is allocated an IP address $A_1$ and granted access to networks such as the public Internet. The ANP 12 notes the allocated IP address and stores it along with the associated network topology within its access network management database [S3].

Step 3

The end user establishes a data session with an AP's server [S6] and requests a service. However, the IP address of the end user may have been changed from $A_1$ to $A_2$ due to network address translation NAT in the firewall [S5]. Also, the port address may have been changed from $P_1$ to $P_2$. Therefore, the application provider 18 cannot establish from the received IP address $A_2$, which ANP or potentially which ISP serves the end user and therefore cannot use it as a reference for any dialogue to exchange information with the ANP 12.

Step 4

Service logic in the application server [S6] decides that it would be advantageous to discover which ANP 12 serves the end user with a view to optimise the service experience for the end user.

The logic therefore constructs a discovery request message using the type of techniques for protocol multiplexing and 'fingerprinting' as described in the IETF standard RFC 5389 Session Traversal Utilities for NAT (STUN). This allows a message, which contains data specific to that application, to be differentiated from other messages sent on the same IP address $A_2$ and port number $P_2$ as application data packets. Within this discovery request message, the application server [S6] includes the AP's globally unique identity (as mentioned in step 1), the address for contacting the application server and a transaction identifier, or identity, that can be used by the ANP 12 and the AP 13 for any network information exchanges to be associated with a specific end user's connection. STUN also describes a way of forming such a transaction identity.

The AP 18 sends this constructed message to the source IP address $A_2$ and port number $P_2$ it received with the end user request. When the message is passed through the firewall [S5], which performs network address translation, the IP address and port numbers are changed back to $A_1$ and $P_1$ and sent to the ANP 12 and ultimately to the end user's local network 10 or directly to the user device.

Step 5

The data probe [S2] in ANP 12 monitors all active data flows through the access network. When the data probe detects the protocol multiplexing profile and fingerprint field in the discovery request message sent by the AP 18 in step 4, it will copy the packet with this message to its request manager server [S4] within the access network for closer examination.

When one of these protocol multiplexed packets is received by the user terminal it should discard it if it cannot understand the multiplexed protocol or ignore the discovery request aspects of the message if it does understand the multiplexed protocol.

Step 6

The request manager server [S4] manages requests and responses exchanged with the application server [S6] of the AP 18. On receipt of a discovery packet copied to it by the data probe [S2] it will create an internal binding of the AP 18 identity, the application server address [S6], the transaction identity and the destination IP address $A_1$ and destination port number $P_1$ it sees in the packet of the discovery request message. If the ANP 12 is operating a pre-arranged, secure connection as described in Step 1, the formation of this binding may be conditional on recognising the AP identity as being valid.

The request manager server [S4] will then establish a data connection to the application server [S6] (or use an existing connection if this is not the first discovery request from the AP 18 to the ANP 12) providing authentication and encryption, if any, based on the information exchanged in step 1. The opening dialogue message from the ANP 12 to the AP's server 56 includes the globally unique identities for ANP 12 and AP 18, the application server [S6] address and the transaction identity inserted by the application server [S6] in the discovery request message in step 4. The combination of the AP identity, the ANP identity and the transaction identity forms a globally unique dialogue reference which is used in subsequent message exchanges between the application server [S6] and the request manager server [S4].

Step 7

The AP's application server [S6] can now make requests for information regarding the characteristics of the user's access properties over the open dialogue, referencing the data stream using the globally unique identity of ANP 12 and their own globally unique dialogue reference described in step 6.

Step 8

The request manager server uses the globally unique dialogue reference described in step 4 to retrieve the end user IP address $A_1$ from the binding stored in step 6. It will then use this IP address to interrogate the access network management database [S3] to establish to which network access port (e.g. copper line, wireless access point, fibre) the user is connected and the properties associated with that access port, e.g. speed, general location, technology type etc, and any other relevant information available regarding the dynamic or static properties of its backhaul network and respond with the requested information to the application server [S6].

Step 9

Using the dialogue reference as described in step 4, the application server [S6] may also make requests via the open dialogue to the request manager server [S4] to apply conditioning of the data packets within the access network for the associated end user's connection to the application server. Such data flow conditioning may include packet marking and queuing prioritisation, bursting into unused or specially allocated access network bandwidth or policing data flows.

Step 10

The request manager server [S4] uses the dialogue reference described in step 4 to retrieve the user IP address $A_1$ and port number $P_1$ from the binding stored in step 6. This IP address is then used to interrogate the access network management database [S3] to establish which parts of the access network topology the end user is using and to apply the requested data flow action to the data flow control system [S1] in the access network for packets with that destination IP address $A_1$ and port number $P_1$, e.g. bandwidth allocation and packet prioritisation.

Step 11

The application server [S6] closes the dialogue with the request manager server [S4] when the session with the user is finished or when the ANP 12 detects that the end user access has been disconnected.

In step 4 above the STUN standard, RFC 5389 Session Traversal Utilities for NAT (STUN) is referenced. The STUN standard describes how a client and server may determine an IP address and port translation on an end-to-end basis. It also describes how protocols can be multiplexed onto the same IP address and port number and be subsequently detected via specific message headers and the use of 'fingerprint' fields. This invention utilises some of the techniques describe in STUN. However, the protocol is enhanced by addition of new fields for the discovery message and is applied in a different architecture and problem space to that described in the standard. Also, this invention is not used between a client and a server but with an intermediate entity, i.e. the access network provider system. Most significantly, this invention's technique is not used for determining address and port translations, as with STUN, but is used for establishing a separate communication path independent to that established between the client and the server, therefore enabling separate message transactions that are not within the user-client data channel. However, other protocols could be devised for multiplexing the discovery message on the data stream sent to the end user.

In a second, alternative, embodiment of the invention a separate communications channel is also, or alternatively, established between the residential gateway 110 in the end user's home network 10 and the application server [S6] in order to enable the AP server [S6] to request the gateway for characteristics of the local access network 10 as well as for controlling up-link packet prioritising. A data probe similar to [S2] and a request manager server similar to [S4] are embodied within the residential gateway 110 and the process for detecting the discovery message and establishing the separate communications channel is the same as in the first embodiment of the invention.

The dedicated communication channels between the AP server [S6] and the request manager server [S4] within the ANP and request manager server function within the residential gateway 110 can exist in parallel.

Figure 4:
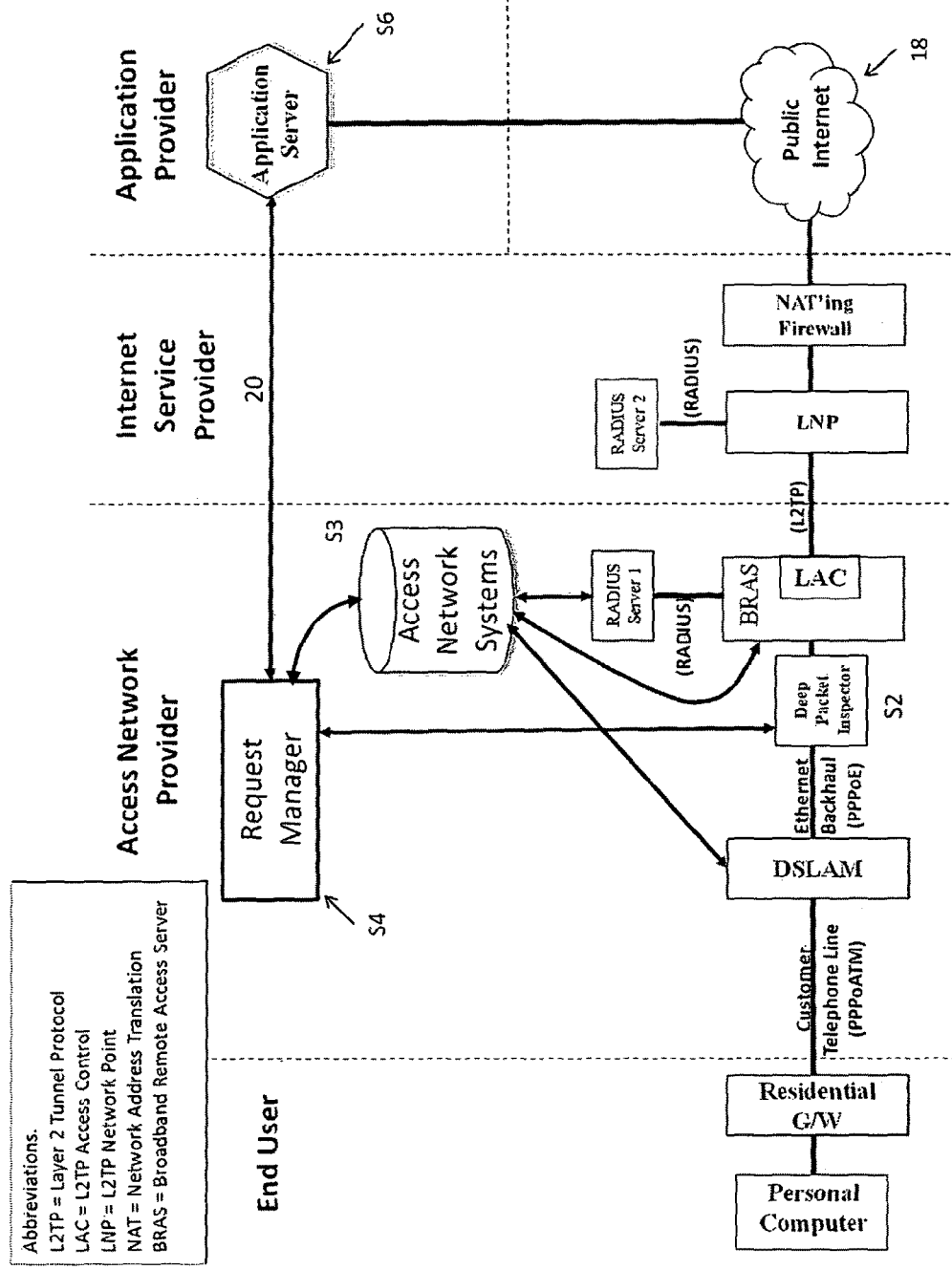
FIG. 4 shows an example of the invention implemented where the ANP is operating a typical broadband network for the local exchange or fibre-to-the curb.

A more detailed view on how the invention is implemented in a typical ADSL or VDSL broadband access network wholesaled to an Internet Service Provider ISP is shown in FIG. 4. The data probe [S2] here comprises a deep packet inspector situated between the Digital Subscriber Line Access Multiplexer (DSLAM) and the broadband remote access server (BRAS) in the access network provider domain 12. The deep packet inspector is connected to the request manager server [S4] and all discovery messages detected by the deep packet inspector within passing flows are copied to the request manager server over this connection. The access networks management database [S3] is connected to the BRAS via a Radius server, to the DSLAM and to the request manager server [S4]. The BRAS will communicate the IP address allocated to the end user by the ISP and the port number via the RADIUS server to database [S3] and the DSLAM communicates the characteristics of the user line and technology to database [S3]. When the request manager server wishes to search the database [S3] for the characteristics of a particular end user's access network it is configured to send the search request, comprising the end user's IP address, to the access network management database [S3] where the characteristics are retrieved and sent back to the request manager server, which forwards the result to the application server [S6] over the dedicated communications channel 20.

Conditioning of the data flow requested by the application provider over the dedicated communications channel 20 can be performed at the deep packet inspector, but could also be performed by the BRAS if supporting this capability and resulting packet priority marking acted on by downstream packet routing components (not shown) with instructions sent by the request manager server [S4] either directly to the deep packet inspector [S2] or to the BRAS via the access networks management database [S3].

A more detailed view on how the invention is implemented for a wholesale Fibre-to-the Premise network operator is shown in FIG. 5. Here, a residential gateway connects to an optical network unit and the deep packet inspector [S2] is situated between an optical line termination and the BRAS. Technology, bandwidth usage and line speed are all communicated from the optical line termination unit to the database [S3] and the speed of the local interface, the data volumes being passed and any restrictions on bandwidth are communicated from the optical network unit to the database [S3]. As in the ADSL/VDSL implementation the deep packet inspector is connected to the request manager server [S4] and all discovery messages detected by the deep packet inspector are copied to the request manager server. The request manager server [S4] is connected to the access networks management database [S3] and when the request manager server wishes to search the database [S3] for access network characteristics it sends the search request and receives a response directly to/from the database. Thereafter the request manager server sends the characteristics to the application server [S6] over the dedicated communications channel 20. Conditioning of the data flow requested by the application provider over the dedicated communications channel 20 can be performed at the deep packet inspector, but could also be performed by the BRAS if supporting this capability and resulting packet priority marking acted on by downstream packet routing components (not shown) with instructions sent by the request manager server [S4] either directly to the deep packet inspector or [S2] or to the BRAS via the access networks management database [S3].

Exemplary embodiments of the invention are realised, at least in part, by executable computer program code which may be embodied in application program data provided by the program modules in the access network provider system 12, request manager server S4 and in the application server S6. When such computer program code is loaded into the memory of each server for execution by the respective processor, it provides a computer program code structure which is capable of performing at least part of the methods in accordance with the above described exemplary embodiments of the invention.

Furthermore, a person skilled in the art will appreciate that the computer program structure referred can correspond to the process flow shown in FIG. 3 where each step of the process can correspond to at least one line of computer program code and that such, in combination with the processor in respective server, provides apparatuses for effecting the described process.

The above embodiments are to be understood as illustrative examples of the invention. Further embodiments of the invention are envisaged. For example, the modules or part of the modules for effecting the described process can be implemented in hardware or a combination of hardware and software.

The application or content server can for example be a media server, a game server or video telephony server.

The embodiment examples given are for fixed broadband ANPs but can be also be applied to mobile broadband access network providers within the capabilities of mobile network and can include the reporting of the mobile handset type.

The embodiment examples given show the generic case of the ANP being a separate organisation to the ISP but the same technique can be utilised by broadband providers that are a combination of ISP and ANP.

In summary, the present invention provides a method and apparatus for providing services that are adapted to the access networks of end users. By providing defined information to an access network provider server and/or gateway, a service provider enables the access network provider to open a dedicated communications channel between itself and the service provider. The service provider can use this channel to request information about the capabilities of the end user's access network as well as for requesting conditioning of data streams sent to said end user.

What is claimed is:

1. A method of providing a data stream to an end user from a service provider, comprising said service provider:
   receiving at a server a request for a data stream from the end user;
   in response to receiving said request constructing a discovery message in order to discover an access network provider for said end user, said discovery message comprising defined information that will enable said access network provider to create an independent dedicated communications channel between a server of the access network provider and the server of the service provider; and
   transmitting said discovery message in the data stream to said end user;
   wherein the defined information of the discovery message identifies the server of the access network provider and a transaction identifier which is unique to the server of the access network provider.

2. A method according to claim 1 wherein the discovery message is multiplexed onto the data stream by utilising an enhancement to the STUN (Session Traversal Utilities for NAT) protocol as defined by the IETF standard RFC 5389, wherein the enhancement is by addition of new fields for the discovery message.

3. A method according to claim 1 further comprising the server of said service provider using said independent dedicated communications channel for requesting and receiving information about the end user's access network from the access network provider system and selecting and/or adapting the service to be delivered to the end user based on said received information.

4. A method according to claim 1 comprising the server of said service provider using said independent dedicated communications channel for conditioning the data stream by requesting control of the prioritisation of packets and/or bandwidth allocation in the data stream in relation to packets in other streams at the access network.

5. A method according to claim 1 wherein the discovery message comprises a unique identity of the server of the service provider, an address for contacting the service provider and a transaction identifier.

6. A service providing server for providing a data stream to an end user, said server comprising
- an interface arranged to receive and transmit data streams from/to end users;
- a computer processor for executing a service logic arranged to construct a discovery message in response to receiving a request for a data stream from the end user, wherein said discovery message comprises defined information that will enable an access network provider to create an independent dedicated communications channel between a server of the access network provider and the server of the service provider;
- wherein said interface is further arranged to transmit said discovery message in the data stream to said end user; and
- the defined information of the discovery message identifies the server of the access network provider and a transaction identifier which is unique to the server of the access network provider.

7. A server according to claim 6 further comprising a service selection module arranged to select and/or adapt the service to be delivered to the end user based on access network information received from the access network provider over the independent dedicated communications channel created by the access network provider server in response to receiving said discovery message.

8. A server according to claim 6 wherein the service logic of the server is further arranged to control the prioritisation of packets in the data stream in the access network in relation to packets in other streams by submitting control information over the independent dedicated communications channel created by the access network provider server in response to receiving said discovery message.

9. A system for providing a data stream to an end user from a service provider said system comprising:
- a server of the service provider comprising:
  - an interface arranged to receive and send data streams from/to end users;
  - service logic arranged to construct a discovery message in response to receiving a request for a data stream from an end user, wherein said discovery message comprises defined information that will enable said access network provider to create an independent dedicated communications channel between a server of the access network provider and the server of the service provider;
  - wherein said interface is further arranged to transmit the discovery message in the data stream to said end user; said system further comprising
- an access network provider system comprising:
  - a data probe arranged to monitor data flows through the access network in order to detect and copy the discovery message packet from the data stream; and
  - a request manager server arranged to receive a copy of said discovery message packet from the data probe and to retrieve the defined information from said discovery message, said request manager server further being arranged in operation to create a dedicated communications channel to the server of the service provider based on the retrieved information.

10. A service provider according to claim 6 further comprising a multiplexer arranged to multiplex the discovery message onto the data stream sent to the end user.

11. A non-transitory computer-readable storage medium which stores a computer program or suite of computer programs which upon execution by one or more computers performs the method steps as set out in claim 1.

12. A non-transitory computer-readable storage medium which stores instructions, which when executed by a programmable processor of a computer, provides operation according to the method of claim 1.

13. A method according to claim 1 further comprising the server of said service provider using said independent dedicated communications channel for requesting and receiving information about the end user's access network from the access network provider system.

14. A method according to claim 1 further comprising the server of said service provider using said independent dedicated communications channel for conditioning the data stream by requesting control of the prioritisation of packets.

15. A method according to claim 1 further comprising:
at the access network provider system:
- monitoring data flows through the access network to detect and copy the discovery message packet from the data stream;
- retrieving the defined information from the discovery message; and
- creating the dedicated communications channel based on the retrieved information.

* * * * *